2,987,829

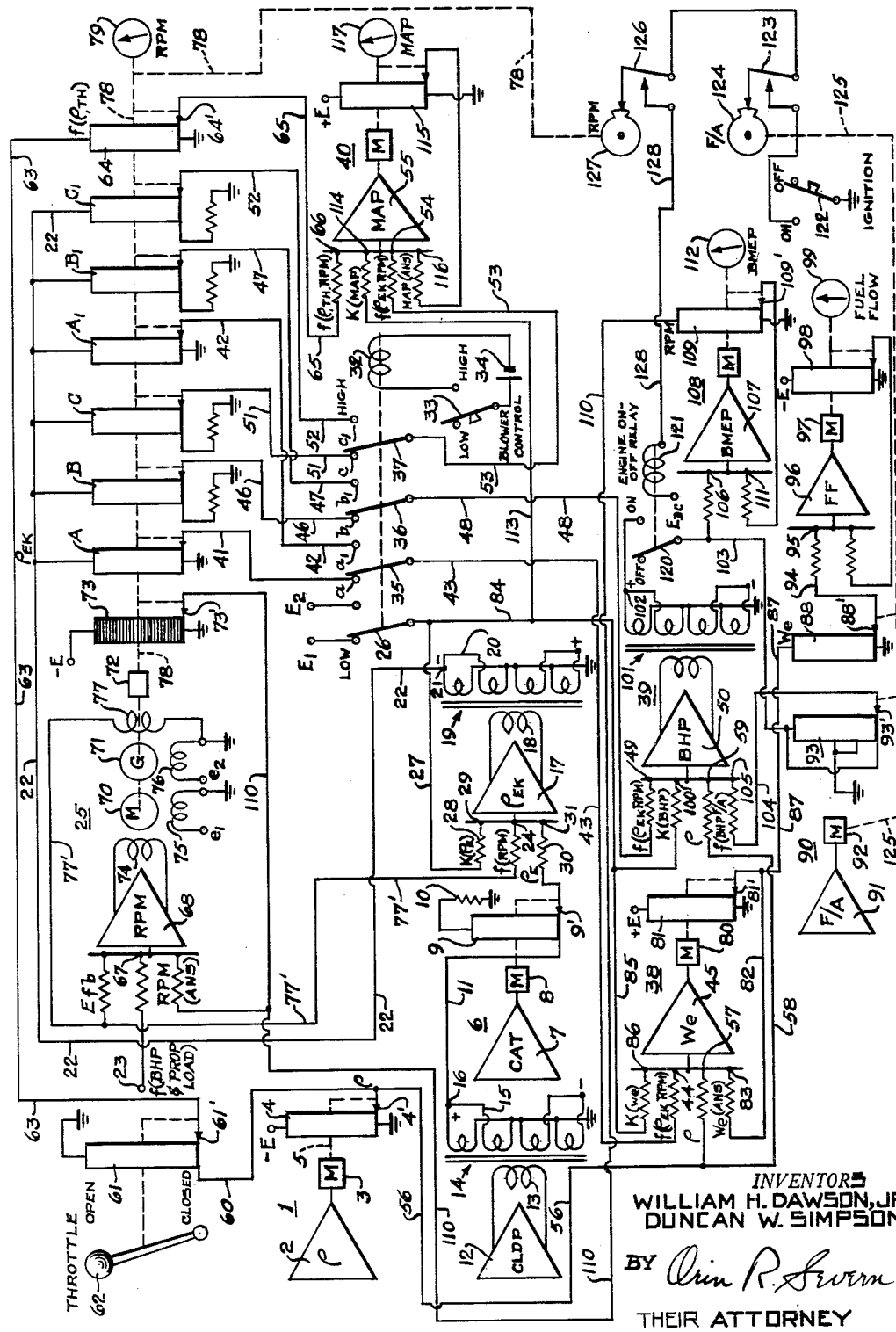

APPARATUS FOR SIMULATING AIRCRAFT ENGINE OPERATION

William H. Dawson, Jr., Waldwick, and Duncan W. Simpson, Wyckoff, N.J., assignors to Curtiss-Wright Corporation, a corporation of Delaware
Filed July 5, 1956, Ser. No. 596,030
9 Claims. (Cl. 35—12)

This invention relates to apparatus for simulating the operation of reciprocating or piston-type aircraft engines, in particular where the simulation is primarily concerned with the engine intake-air flow and closely related systems. Apparatus of this character is especially useful for ground training of aircraft personnel.

The simulation of various aircraft engine conditions incident to both on-ground and flight operation, such as engine speed (r.p.m.), manifold absolute pressure (MAP), engine air flow ($W_e$), brake horsepower (BHP) and brake-mean-effective-pressure (BMEP), fuel-air ratio (F/A), fuel flow (FF), etc., has previously been proposed for ground training of flight crews. However, the prior apparatus in certain instances has not been sufficiently accurate and realistic in regard to the effects of variations in air density on engine performance to meet present requirements for simulation and training. This is even more pronounced where non-standard atmospheric temperature and pressure conditions must be taken into account. For example, a material deviation from the standard air temperature for a given altitude of the simulated flight may cause a serious error in the computed weight of engine intake air, and hence fuel-air ratio, engine power, etc., where the computation is based simply on simulated standard ambient conditions.

A principal object of the present invention therefore is improved simulating apparatus of the above character that is more accurate and realistic in its simulation of critical engine conditions, in particular those conditions such as engine air flow and closely associated conditions, that are comparatively sensitive to variations in air density.

Another object of the invention is improved simulating apparatus of the aforesaid character that provides for simulated air density correction under all conditions of operation for more accurately representing certain engine conditions that are a function of combined air density and engine r.p.m. including weight of engine intake air, manifold absolute pressure, weight of engine fuel and engine power.

The weight of engine intake air ($W_e$) or engine air flow, may for the purposes of this invention be expressed by the equation:

$$W_e = (\rho_E + K_1)K_2 f(\text{r.p.m.}) + K_3\rho + K_4$$

where $\rho$ is the density of ambient air, $\rho_E$ is the density of the engine-intake air, r.p.m. is engine speed, and $K_1$, $K_2$, $K_3$ and $K_4$ are biasing constants depending on engine design and supercharger ratio.

The equations for MAP and BHP also may be expressed in this same general form, except that the constants $K_2$, $K_3$ and $K_4$ would be different for these equations.

The aforesaid basic equation is applicable to but one blower (supercharger) pressure ratio, as for example "high blower." Where "low blower" is used the same basic equation is applicable except that the constants are different. In the present simulating system, air density is the prime parameter of the design as indicated in the above equation wherein $W_e$ is expressed as a function of combined air density and speed; also as above indicated, the other closely associated engine conditions such as MAP and engine power will be expressed as functions of air density and engine speed. In simulating an engine condition that is affected by the transition between "high" and "low" blower, the engine condition is represented as corrected by a corresponding change in the constants of the above equation.

The invention will be more fully set forth in the following description referring to the accompanying drawing, and the features of novelty will be pointed out with particularity in the claims annexed to and forming a part of this specification.

Referring to the drawing, the single figure thereof is a diagrammatic illustration of apparatus embodying the present invention for simulating certain phases of the operation of an aircraft reciprocating engine.

Apparatus of the present character is generally incorporated in ground-based equipment for training aircraft personnel in both flight and engine operating techniques. Such equipment has simulated aircraft controls including aileron, elevator, rudder and throttle controls that are positioned by the pilot for controlling computing means representing certain flight and engine conditions respectively as known in the art.

In accordance with the above equation for $W_e$, there is provided means for producing control quantities representing respectively the density of ambient air $\rho$, and the density of the engine-intake air $\rho_E$, hereinafter referred to as engine air density. The measurement of $\rho_E$ is in the engine-intake system down-stream from the carburetor to the supercharger inlet. The ambient air density system is generally indicated at 1 and comprises suitable signal producing means, such as a servo system having a servo amplifier 2 for computing $\rho$, a servo motor 3 responsive to the amplifier output and a potentiometer 4 having an adjustable brush contact or slider 4' that is suitably operated by the motor through a connection indicated at 5. The potentiometer 4 is energized at its upper terminal by an alternating current signal of proper sense —E, and is grounded at its lower terminal so that the derived voltage at slider 4' represents ambient air density $\rho$.

The engine air density system is generally indicated at 6 and comprises a servo amplifier 7 that produces an output corresponding to carburetor air temperature (CAT) for in turn controlling the servo motor 8 and the slider 9' of the potentiometer 9. This potentiometer is grounded through a resistance 10 at its upper terminal and is energized at its lower terminal by an A.C. signal on line 11 from the output of an amplifier 12 that computes "carburetor lower deck pressure" (CLDP). Specifically the output of this amplifier energizes a primary winding 13 of a transformer 14, the compound secondary winding 15 of which is connected at terminal 16 to the line 11 for applying a signal of proper sense to the potentiometer 9. In view of the fact that the carburetor lower deck pressure is measured in the engine air-intake system between the throttle and the inlet to the internal supercharger, and since the temperature of the engine intake air does not vary materially within the intake from the carburetor to the aforesaid supercharger inlet, the engine-intake air density $\rho_E$ may be represented by combining the CLDP and CAT control quantities. The resultant quantity $\rho_E$ is represented by the derived voltage at CAT slider 9'.

The various computing networks for producing the control quantities representing respectively $\rho$, CLDP and CAT are not described herein since they are fully described in copending applications all assigned to the same assignee as the present invention. The $\rho$ system is disclosed in U.S. Patent No. 2,788,589, granted April 16, 1957, to R. Stern; the CLDP system is disclosed in U.S. Patent No. 2,909,853, granted October 27, 1959, to J. Port, and the CAT system is disclosed in U.S. Patent No. 2,808,658, granted October 8, 1957, to R. Stern and W. Dawson.

The signal $\rho_E$ from the potentiometer 9 is combined with a constant $K_1$ as indicated in the above equation, by means of a summing amplifier 17, the output of which energizes the primary winding 18 of a transformer 19 having a compound secondary winding 20. The resultant signal $\rho_{EK}$ of proper sense is taken from the terminal 21 of the secondary winding over line 22 for energizing as presently described a plurality of engine r.p.m. function potentiometers of an r.p.m. servo system generally indicated at 25. The constant $K_1$ that is combined with the signal $\rho_E$ is represented by a constant A.C. signal that is fed according to the blower condition alternatively from voltage source $E_1$ or $E_2$ through the blower control relay switch 26, and line 27 to the proportioning resistance 28 that is connected to $\rho_{EK}$ amplifier input terminal 29. The $\rho_E$ signal is likewise fed to a proportioning resistance 30 that is connected to the amplifier input terminal 31 and the A.C. signals at terminals 29 and 31 are algebraically summed in well-known manner by the amplifier.

The blower control relay switch 26 is controlled by the "high-low" blower control relay 32 for positioning the switch 26 so as to represent either "low" or "high" blower, thereby varying the constant $K_1$ according to the blower condition. As shown, closing of the blower control switch 33 by the flight engineer to represent "high blower" causes energization of the coil 32 from source 34 so as to throw the K switch 26 to the "high blower" position where it is connected to the constant voltage source $E_2$. De-energization of the relay coil by opening the switch 33 to represent "low blower" causes the K switch 26 to connect with the constant voltage source $E_1$ as shown. Thus $\rho_{EK}$ is corrected according to high or low blower operation.

For the purpose of introducing dynamic characteristics to the $\rho_{EK}$ computer, a signal representing a function of engine r.p.m., in particular the rate of change of r.p.m., is fed to the input terminal 24. This signal voltage is derived from the r.p.m. servo system hereinafter described and constitutes the r.p.m. feedback control voltage. In operation, the r.p.m. feedback signal functions as a damper simulating the inertia of engine parts that would affect operation of the blower, etc. and hence the engine intake air density at a given time.

The $\rho_{EK}$ signal is combined with an appropriate r.p.m. control quantity for computing respective engine conditions by means of different function potentiometers A, B, C, and alternatively $A_1$, $B_1$ and $C_1$, of the r.p.m. servo system 25 above referred to. The combined $\rho_{EK}$ and r.p.m. function signals from the respective potentiometers A, B and C or $A_1$, $B_1$ and $C_1$ as the case may be, are fed through the corresponding blower control relay switches 35, 36 and 37 to the $W_e$ computing system 38, the BHP computing system 39 and the MAP computing system 40. The function potentiometers A, B and C are designed to conform to the value of the constant $K_2$ in the corresponding $W_e$, BHP or MAP equation for "low blower" operation, and the potentiometers $A_1$, $B_1$ and $C_1$ are designed to conform to the value of $K_2$ for "high blower" operation. In particular, the computation of $W_e$ is primarily controlled by the signal derived from either potentiometer A or $A_1$ that is fed by line 41 or line 42 from the respective potentiometer to the relay switch contact $a$ or $a_1$. The switch 35 selects the signal according to "high" or "low" blower operation which is fed by line 43 to the proportioning resistance connected to the input terminal 44 of the $W_e$ servo amplifier 45.

The computation of BHP is in part controlled by the signal derived from either potentiometer B or $B_1$ that is fed by line 46 or line 47 from the respective potentiometer to the relay switch contact $b$ or $b_1$. The switch 36 selects the signal according to high or low blower operation which is fed by line 48 to the proportioning resistance connected to the input terminal 49 of the BHP summing amplifier 50.

For computing MAP an essential signal is that derived from either potentiometer C or $C_1$ that is fed by line 51 or line 52 from the respective potentiometer to the relay switch contact $c$ or $c_1$. The switch 37 selects the signal according to high or low blower operation which is fed by line 53 to the proportioning resistance connected to the input terminal 54 of the MAP servo amplifier 55.

The remainder of the $W_e$ equation above referred to is concerned with ambient air density $\rho$. This factor is added to the aforesaid computations by means of the signal derived from the $\rho$ system 1. For the $W_e$ computation, the $\rho$ signal from slider 4' is fed by line 56 to the proportioning resistance connected to the input terminal 57 of the $W_e$ servo amplifier 45; in computing BHP the same signal is fed over lines 56 and 58 to the proportioning resistance connected to the input terminal 59 of the BHP summing amplifier 50; and the $\rho$ signal from slider 4' is further combined with functions of throttle position and engine r.p.m. in computing MAP. To this end the signal from slider 4' is fed over line 60 to the lower terminal of a potentiometer 61, the slider 61' of which is adjustable as indicated by the simulated throttle lever 62. The potentiometer is grounded at its upper terminal (open throttle) and the derived voltage at slider 61' is in turn fed over line 63 to a potentiometer 64 of the r.p.m. system. The voltage derived at slider 64' is in turn fed by line 65 to the proportioning resistance connected to input terminal 66 of the MAP servo amplifier 55.

Where the engine to be simulated is of the power recovery type identified by the trade name "Turbo-Compound," i.e. power from the engine exhaust gases is recovered and returned to the engine crank shaft, the aforesaid signal circuit connected to the MAP input terminal 66 is adapted to provide more realistic simulation of MAP. As above noted the signal represents combined functions of $\rho$, throttle position and engine r.p.m. In the "Turbo-Compound" engine, the MAP does not vary linearly with $\rho$ as indicated in the basic equation, particularly for part-throttle operation, so that for this case the throttle function potentiometer 61 and the r.p.m. function potentiometer 64 are designed accordingly.

The computation of r.p.m. which determines the positioning of the r.p.m. servo system 25 is not described herein as it is fully disclosed in Patent No. 2,788,589 above referred to. It is sufficient to indicate that the signal for energizing the terminal 23 of the proportioning resistance connected to the input terminal 67 of the r.p.m. servo amplifier 68 corresponds to a signal representing a function of BHP and propeller load, as at terminal 35, FIG. 1 of the aforesaid patent. The description of the r.p.m. servo mechanism at 25 will also suffice for the various servo motor systems herein referred to which are essentially the same as regards operating mechanism. The r.p.m. system which is of the self-positioning integrating type comprises a servo amplifier 68 which is fed by the computed r.p.m. signal voltage, and a motor 70 that is responsive to the amplifier output for driving a feedback generator 71 and for gang-operating a plurality of potentiometers, the latter being operatively connected through a reduction gear box 72 to the motor-generator. For simplicity of illustration the "answer" potentiometer card 73 (for self-positioning of the servo) only is illustrated herein as being wound with resistance wire, it being apparent that the other function cards may be wound as required. The servo amplifier 68 is of the summing type for determining the resultant of respective A.C. input signal voltages and for computing purposes suitable proportioning resistances are included as illustrated in the amplifier input circuits. Amplifiers of this type are well-known in the art for algebraically summing a plurality of individual A.C. voltages of varying magnitude and polarity and a detailed circuit illustration thereof is unnecessary.

That part of the servo network including a motor-generator (or motor) is diagrammatically indicated in other parts of the drawings as M. The motor 70 is of the two-phase type, the control phase winding 74 being energized by the servo amplifier output as indicated and the other phase winding 75 by a constant reference A.C. voltage $e_1$ dephased 90° from the control voltage. The operation of this type of motor is well-known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor control circuitry is shown in elementary form in the interest of clearness and it will be understood that known circuitry for improving motor characteristics, such as obtaining fast response, etc., may be used as desired.

The motor drives a two-phase feedback generator 71 also having the reference phase winding 76 energized by a 90° dephased reference voltage $e_2$, the other phase winding 77 generating a velocity feedback voltage $E_{fb}$ for purposes of speed control. The motor also serves to gang-operate through the gear reducer 72 and suitable mechanical connections indicated by dotted lines 78 one or more potentiometers and indicators; in the present case, the potentiometers 73, A, B, C, $A_1$, $B_1$, $C_1$ and 64 and an indicator 79 representing r.p.m. are driven by the motor.

The individual potentiometer resistance elements, such as the unit 73, may be of the well-known wound-card type and are of circular or band form in practice but are diagrammatically illustrated in a plane development for clearness. A structural arrangement that may be conveniently used for a servo motor and potentiometer combination of the character above referred to is shown by Patent No. 2,431,749, issued December 2, 1947, to R. B. Grant for "Potentiometer Housing and Positioning Structure." Operation of the servo motor 70 in either direction therefore causes the potentiometer slider contact 73', etc. to move to a corresponding angular position on the potentiometer element for deriving, i.e. selecting or picking off, a voltage dependent on the contact position.

Each potentiometer of each servo system is shaped or contoured so that the value of the derived voltage at the slider contact bears a desired relationship to the angular movement of the contact depending on the particular function of the potentiometer, and has a voltage impressed across its terminals depending as to instantaneous polarity and magnitude also on the function of the potentiometer. The contour of all function potentiometers represents the derivative of the function concerned and since this involves mathematical relationships the potentiometer cards are shown uniform for simplifying the disclosure. Specifically, the contour or width variation and therefore the resistance distribution of a potentiometer is proportional to the derivative of the function of the characteristic to be simulated with respect to the variable represented by the setting of the potentiometer. Thus the width of the card at any given contact position is determined by the linear or non-linear character of the function. The r.p.m. servo cards function to derive signals used in the computaion of $W_e$, BHP, and MAP as presently described.

The complete $W_e$ computing system 38 comprises the servo amplifier 45 above referred to, a servo motor 80 and an answer potentiometer 81 for producing at slider 81' the $W_e$ answer signal that is fed over line 82 to the proportioning resistance connected to the input terminal 83 of the amplifier 45. For high and low blower correction, a K signal from relay switch 26 is fed over lines 84 and 85 to the proportioning resistance connected to the input terminal 86 of amplifier 45. The summed signals accordingly produce a resultant $W_e$ control quantity according to the above equation.

For the purpose of computing the weight of engine fuel or fuel flow (FF), the $W_e$ answer signal from slider 81' is fed over line 87 to the potentiometer 88 of a fuel air ratio (F/A) system generally indicated at 90. The computing circuitry for this system is disclosed in U.S. Patent No. 2,824,388, granted February 25, 1958, to Stern et al. and assigned to the same assignee as the present invention. The F/A system includes a servo amplifier 91, servo motor 92 for controlling the potentiometers 93 and 88. Accordingly the derived voltage at slider 88' of potentiometer 88 may represent weight of fuel since engine intake air is now cancelled out. This signal is fed over line 94 to the input terminal 95 of the FF servo amplifier 96, the output of which controls the motor 97, answer potentiometer 98 and fuel flow indicator 99.

The complete computing system for BHP includes in addition to the density and r.p.m. function signals at terminals 49 and 59, a K signal from relay switch 26 over line 84 to the proportioning resistance connected to the input terminal 100 of the amplifier 50, and a signal from the F/A system representing a function of BHP and F/A. The BHP function is derived from the BHP transformer 101, the primary winding of which is energized by the output of the amplifier 50 and the compound secondary winding of which produces at terminal 102 a signal of proper sense that is fed over line 103 to the F/A function potentiometer 93. This potentiometer, which is energized at opposites terminals by the BHP signal and is grounded at its mid-point, is designed so that the voltage derived at slider 93' represents the desired function of BHP and F/A. This signal is fed over line 104 to the proportioning resistance connected to the input terminal 105 of BHP amplifier 50.

A typical method of using a correction factor is illustrated by the above-described circuitry between the BHP and F/A systems including the F/A potentiometer 93. Here the BHP signal is modified according to a given variation in F/A for return input to the BHP amplifier at terminal 105. This method of correction can be applied to other systems where required.

The BHP signal at terminal 102 is also normally used to energize the input terminal 106 of the servo amplifier 107 of the BMEP system 108. This computing system includes a potentiometer 109 that is energized by an r.p.m. signal over line 110 from the slider 73' of the r.p.m. answer potentiometer 73. The resulting derived voltage at BMEP slider 109' is fed to the input terminal 111 of amplifier 107 whereby the resulting amplifier output represents BMEP. The servo system also controls a BMEP indicator 112 as in practice.

For added realism, the BHP signal at output terminal 102 is removed from the BMEP and F/A systems when the engine is represented as "off," i.e., without combustion. It will be apparent that when the engine is "windmilling" for example, with the engine "off," there will be no BMEP indication although there will of course be MAP and $W_e$ indications. For simulating this, a switch 120 controlled by the engine "on-off" relay 121 is adapted to interrupt the connection between terminal 102 and conductor 103 when the engine is "off," and to complete the connection when the engine is "on." Basic requirements for "engine-on" operation are that (1) r.p.m. exceed zero, (2) F/A exceed a predetermined value such as .045, and (3) ignition be "on." Control of the relay 121 may therefore be accomplished by completing the relay coil ground circuit through the ignition switch 122, F/A switch 123 operated from the F/A servo by cam 124 and connection 125, r.p.m. switch 126 operated from the r.p.m. servo through cam 127 and connection 78 and, lead 128 to one terminal of the relay coil. The other terminal is connected to a voltage source, $E_{dc}$. Accordingly, when the ignition switch is "on" and F/A and r.p.m. switches are closed to indicate "engine-on" operation, the relay 21 is energized and switch 120 closed to complete the connection between the BHP and BMEP systems.

The complete MAP computing system includes in addition to the density and r.p.m. function signals at input terminals 66 and 54, a K signal over lines 84 and 113 from the relay switch 26 to the proportioning resistance connected to the MAP input terminal 114, and the MAP answer signal from potentiometer 115 at input terminal 116. The MAP servo also controls an MAP indicator 117 as in practice.

It is therefore apparent that in accordance with the present invention the simulation of critical engine conditions including engine intake air flow, MAP and engine power takes into account not only variations in simulated density of ambient and engine intake air but also the change in engine characteristics incident to high and low blower operation. This simulation is accomplished with a minimum of circuitry and servo equipment so that the complete system is not only more accurate and responsive in operation but also is less costly.

For purposes of simplicity of disclosure, a minimum number of the blower relay switches are shown, such as for example a single switch 26 for selecting the K signal ($E_1$ or $E_2$) for the $\rho_{EK}$, MAP, $W_E$ and BHP systems. It will be understood of course that the sense of constant K may vary not only in the system equations for each engine but also for different engines, so that where required a separate relay switch may be added for selecting signal voltages of the proper polarity or sense for the computing system in question. A single signal source for each blower ratio may of course be used for K signals of the same sense as the proportioning resistances of the computing systems determine the magnitude of the input signal.

Also, the disclosure is simplified by the omission of secondary circuits such as circuits controlled by an instructor in well-known manner for simulating "trouble" by either disabling or modifying the operation of systems representing critical engine conditions. For example, the instructor may introduce signals varying in sense to the $W_e$, r.p.m. and F/A systems for simulating various operating difficulties or irregularities; also he may introduce such signals to the $\rho_{EK}$ system for simulating unexpected change in engine intake air density, thereby producing a new MAP indicator reading, etc. As used herein, the term "engine intake air" means the supply of air from the carburetor as distinguished from ambient air.

The function potentiometers shown uniformly herein for convenience are not necessarily uniformly wound and may of course be suitably contoured, or have variable resistance characteristics, to correspond with the specific functions or engine characteristics to be simulated.

The control voltages for operating the training apparatus of the present invention are alternating current voltages, except where otherwise indicated. The instantaneous polarity of the signal voltage where indicated refers to the phase relation with respect to a reference A.C. voltage. It will be understood however that the present invention is not limited to alternating current circuitry and apparatus and that a D.C. system may be used if desired.

It should be understood that this invention is not limited to specific details of construction and arrangement thereof herein illustrated, and that changes and modifications may occur to one skilled in the art without departing from the spirit of the invention.

What is claimed is:

1. In flight simulating apparatus having means operable according to the positioning of simulated controls for representing flight and engine conditions, including manifold air pressure and engine power, the engine conditions being characteristic of a reciprocating-type aircraft engine having a supercharger system, a system for simulating an indicated engine condition that is primarily a function of combined air density and engine r.p.m. comprising voltage deriving means operable in response to control quantities representing the simulated carburetor air temperature and the air pressure in the engine air-intake system between the carburetor and supercharger respectively for jointly producing another control potential representing density of engine intake air, means for producing another control potential representing a function of simulated engine r.p.m., means for combining said air density and r.p.m. control potentials for in turn producing a resultant potential, and means responsive to said resultant potential for representing said indicated engine condition.

2. In flight simulating apparatus having means operable according to the positioning of simulated controls for representing flight and engine conditions, the engine conditions being characteristic of a reciprocating-type aircraft engine having a supercharger system and including engine air flow, manifold air pressure and engine power, electrical means responsive to control potentials representing the simulated carburetor air temperature and the air pressure in the engine air-intake system between the carburetor and supercharger for jointly producing another control potential representing density of engine intake air, means for producing a plurality of other control potentials representing functions of simulated engine r.p.m. according to engine supercharger characteristics and a plurality of electrical systems, each jointly responsive to the engine intake air density control potential and a corresponding r.p.m. control potential for representing respectively engine air flow, manifold air pressure and engine power.

3. Apparatus as specified in claim 2 wherein the electrical system representing engine power includes an electrical brake horse-power (BHP) computer, said computer producing potential representing BHP, means for producing control potential representing a function of fuel-air ratio (F/A) and for combining said function potential with the BHP potential, said BHP computer being responsive to the aforesaid combined potentials and also being responsive to the combined engine intake air density and r.p.m. potentials.

4. Apparatus as specified in claim 2 including means for producing control potential representing simulated fuel-air ratio, and means controlled by the engine intake air flow system for producing control potential representing engine intake air flow, and means responsive to the combined potentials for representing engine fuel flow.

5. Apparatus as specified in claim 2 wherein the electrical system representing engine power includes a BHP computer and a brake-mean-effective-pressure (BMEP) computer, said BHP computer being responsive to the aforesaid combined control potential for the engine power system and adapted in turn to produce potential representing BHP, said BMEP computer being jointly responsive to said BHP potential and to an r.p.m. control potential for representing BMEP.

6. Apparatus as specified in claim 2 including means for producing control potential representing combined functions of ambient air density, throttle position and engine r.p.m., wherein the electrical system representing manifold absolute pressure (MAP) is responsive to the aforesaid combined control potential and is also responsive to the combined engine intake air density and r.p.m. potentials for representing MAP.

7. In flight simulating apparatus having means operable according to the positioning of simulated controls for representing flight and engine conditions, the engine conditions being characteristic of a reciprocating-type aircraft engine having a supercharger system and including engine air flow, manifold air pressure and engine power, electrical means responsive to control potentials representing the simulated carburetor air temperature and the air pressure in the engine air-intake system between the carburetor and supercharger for jointly producing another control potential representing density of engine intake air, means for producing a plurality of other control potentials representing functions of simulated engine r.p.m. according to engine supercharger characteristics, a plurality of electrical systems, each jointly responsive to the engine intake air density control potential and a corresponding r.p.m. control potential for representing respectively engine air flow, manifold air pressure and engine power, means for varying the effect of the aforesaid air density and r.p.m. combined potentials applied to respective electrical systems so as to represent different characteristic effects of blower operation on the respective engine condition incident to simulated "high" or "low" blower respectively, and means for selecting the combined potentials corresponding to the respective engine condition according to blower operation and for applying them respectively to the aforesaid electrical systems.

8. In flight simulating apparatus having means operable according to the positioning of simulated controls for representing flight and engine conditions, the engine conditions being characteristic of a reciprocating-type aircraft engine having a supercharger system and including engine air flow, manifold air pressure and engine power, electrical means responsive to control potentials representing the simulated carburetor air temperature and the air pressure in the engine air-intake system between the carburetor and supercharger for jointly producing another control potential representing density of engine intake air, means for producing a plurality of other control potentials representing functions of simulated engine r.p.m. according to engine supercharger characteristics, said r.p.m. function means comprising a servo system operable according to simulated r.p.m. having a plurality of function generating means, two for each engine condition system designed for alternate use according to simulated "high" or "low" blower, each function generating means arranged to be energized by engine intake air density potential for in turn producing combined potential, a plurality of electrical systems for representing respectively engine air flow, manifold air pressure and engine power, each responsive to an aforesaid combined potential, and selecting means operable in response to simulated "high" or "low" blower for operatively connecting a selected function generating means to control the corresponding engine condition system 9. In flight simulating apparatus having means operable according to the positioning of simulated controls for representing flight and engine conditions, the engine conditions being characteristic of a reciprocating-type aircraft engine having a supercharger system and including engine air flow, manifold air pressure and engine power, electrical means responsive to control potentials representing the simulated carburetor air temperature and the air pressure in the engine air-intake system between the carburetor and supercharger for jointly producing another control potential representing density of engine intake air, means for producing a plurality of other control potentials representing functions of simulated engine r.p.m. according to engine supercharge characteristcis, means for producing additional control potential representing ambient air density, a plurality of electrical systems for representing respectively engine air flow, manifold air pressure and engine power, each system jointly responsive to the ambient air density, engine intake air density, and corresponding r.p.m. control potentials, the system representing engine intake air flow also being responsive to one of a plurality of potentials representing characteristic constants, and means for selecting a characteristic constant potential operable according to simulated "high" or "low" blower operation.

References Cited in the file of this patent
UNITED STATES PATENTS

| | | |
|---|---|---|
| 2,494,479 | Lukacs | Jan. 10, 1950 |
| 2,499,597 | Lukacs | Mar. 7, 1950 |
| 2,506,949 | Burelbach | May 9, 1950 |
| 2,533,484 | Lukacs | Dec. 12, 1950 |
| 2,584,261 | Davis et al. | Feb. 5, 1952 |
| 2,731,737 | Stern | Jan. 24, 1956 |
| 2,824,388 | Stern et al. | Feb. 25, 1958 |

OTHER REFERENCES

Electronics Instruments (Greenwood), 1948, page 132.